(12) United States Patent
Han et al.

(10) Patent No.: US 10,364,910 B2
(45) Date of Patent: Jul. 30, 2019

(54) FLUID CONTROL DEVICE

(71) Applicant: Microjet Technology Co., Ltd., Hsinchu (TW)

(72) Inventors: Yung-Lung Han, Hsinchu (TW); Chi-Feng Huang, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 0 days.

(21) Appl. No.: 15/641,068

(22) Filed: Jul. 3, 2017

(65) Prior Publication Data

US 2018/0066762 A1    Mar. 8, 2018

(30) Foreign Application Priority Data

Sep. 5, 2016   (TW) .............................. 105128595 A

(51) Int. Cl.
| | | |
|---|---|---|
| *F04B 43/04* | (2006.01) | |
| *F16K 31/00* | (2006.01) | |
| *F16K 31/02* | (2006.01) | |
| *H01L 41/04* | (2006.01) | |
| *B41J 2/16* | (2006.01) | |

(Continued)

(52) U.S. Cl.
CPC ........... *F16K 31/004* (2013.01); *B41J 2/1623* (2013.01); *B41J 2/17596* (2013.01); *F04B 43/0054* (2013.01); *F04B 43/04* (2013.01); *F04B 43/046* (2013.01); *F04B 45/04* (2013.01); *F04B 45/047* (2013.01); *F04B 53/22* (2013.01);

(Continued)

(58) Field of Classification Search
CPC .... F04B 17/003; F04B 43/046; F04B 43/095; F16K 31/004; F16K 31/005; F16K 99/0048; H01L 41/0913; H01L 41/0973
See application file for complete search history.

(56) References Cited

U.S. PATENT DOCUMENTS 7,863,035 B2 *   1/2011   Clemens ................ G01N 27/27
                                                    417/322
7,972,124 B2 *   7/2011   Hirata .................. F04B 39/1093
                                                    417/413.2

(Continued)

FOREIGN PATENT DOCUMENTS

CN          102046978 A      5/2011
CN          102536755 A      7/2012

(Continued)

*Primary Examiner* — Matthew W Jellett
(74) *Attorney, Agent, or Firm* — Birch, Stewart, Kolasch & Birch, LLP

(57) ABSTRACT

A fluid control device includes a piezoelectric actuator and a deformable substrate. The piezoelectric actuator includes a piezoelectric element and a vibration plate. The piezoelectric element is attached on a surface of the vibration plate. The piezoelectric element is subjected to deformation in response to an applied voltage. The vibration plate is subjected to a curvy vibration in response to the deformation of the piezoelectric element. The deformable substrate includes a flexible plate and a communication plate, which are stacked on each other. Consequently, a synchronously-deformed structure is defined by the flexible plate and the communication plate collaboratively. There is a specified depth between the flexible plate and the vibration plate. The flexible plate includes a movable part corresponding to the vibration plate.

19 Claims, 15 Drawing Sheets

(51) Int. Cl.
    *B41J 2/175* (2006.01)
    *F04B 43/00* (2006.01)
    *F04B 45/04* (2006.01)
    *F04B 45/047* (2006.01)
    *F04B 53/22* (2006.01)
    *H01L 41/00* (2013.01)
(52) U.S. Cl.
    CPC .............. *F16K 31/02* (2013.01); *H01L 41/04* (2013.01); *F16K 31/00* (2013.01); *H01L 41/00* (2013.01)

(56) References Cited

U.S. PATENT DOCUMENTS

| | | | | |
|---|---|---|---|---|
| 8,157,549 | B2* | 4/2012 | Chen | B41J 2/17596 417/571 |
| 8,651,630 | B2* | 2/2014 | Jilani | B41J 2/14282 347/68 |
| 8,684,707 | B2* | 4/2014 | Kanai | F04B 45/047 417/410.2 |
| 9,028,226 | B2* | 5/2015 | Hirata | F04B 45/047 417/413.2 |
| 9,033,683 | B2* | 5/2015 | Kodama | A61B 5/0235 137/510 |
| 9,237,854 | B2* | 1/2016 | Kodama | A61B 5/0235 |
| 2011/0076170 | A1* | 3/2011 | Fujisaki | F04B 45/047 417/415 |
| 2011/0285794 | A1 | 11/2011 | Jilani et al. | |
| 2013/0058810 | A1* | 3/2013 | Hirata | F04B 43/043 417/413.2 |
| 2013/0071269 | A1 | 3/2013 | Fujisaki et al. | |
| 2013/0178752 | A1 | 7/2013 | Kodama et al. | |
| 2013/0209279 | A1 | 8/2013 | Locke et al. | |
| 2014/0022307 | A1 | 1/2014 | Gao et al. | |
| 2014/0028153 | A1* | 1/2014 | Smirnov | F04B 43/046 310/328 |
| 2014/0377099 | A1* | 12/2014 | Hsueh | F04B 43/046 417/413.2 |
| 2015/0071797 | A1* | 3/2015 | Takeuchi | F04B 43/0054 417/413.2 |
| 2015/0114222 | A1 | 4/2015 | Murakami | |

FOREIGN PATENT DOCUMENTS

| | | |
|---|---|---|
| CN | 103140674 A | 6/2013 |
| CN | 102979704 B | 7/2015 |
| CN | 205383064 U | 7/2016 |
| CN | 206092351 U | 4/2017 |
| DE | 19918694 A1 | 11/1999 |
| EP | 2 842 753 A1 | 3/2015 |
| EP | 3109472 A1 | 12/2016 |
| JP | 2013-57246 A | 3/2013 |
| JP | 2013-57247 A | 3/2013 |
| JP | 2016053371 | 4/2016 |
| TW | 200831297 A | 8/2008 |
| TW | 200909683 A | 3/2009 |
| TW | M507979 U | 9/2015 |
| TW | M513272 U | 12/2015 |
| TW | 201610298 A | 3/2016 |
| WO | 2009/112866 A1 | 9/2009 |
| WO | 2010085239 A1 | 7/2010 |
| WO | WO 2012/141113 A1 | 10/2012 |

* cited by examiner

FLUID CONTROL DEVICE

FIELD OF THE INVENTION

The present invention relates to a fluid control device, and more particularly to a fluid control device with a deformable base.

BACKGROUND OF THE INVENTION

With the advancement of science and technology, fluid control devices are widely used in many sectors such as pharmaceutical industries, computer techniques, printing industries or energy industries. Moreover, the fluid control devices are developed toward elaboration and miniaturization. The fluid control devices are important components that are used in for example micro pumps, micro atomizers, printheads or industrial printers for transporting fluid. Therefore, it is important to provide an improved structure of the fluid control device.

FIG. 1A is a schematic cross-sectional view illustrating a portion of a conventional fluid control device. FIG. 1B is a schematic cross-sectional view illustrating an assembling shift condition of the conventional fluid control device. The main components of the conventional fluid control device 100 comprise a substrate 101 and a piezoelectric actuator 102. The substrate 101 and the piezoelectric actuator 102 are stacked on each other, assembled by any well known assembling means such as adhesive, and separated from each other by a gap 103. In an ideal situation, the gap 103 is maintained at a specified depth. More particularly, the gap 103 specifies the interval between an alignment central portion of the substrate 101 and a neighborhood of a central aperture of the piezoelectric actuator 102. In response to an applied voltage, the piezoelectric actuator 102 is subjected to deformation and a fluid is driven to flow through various chambers of the fluid control device 100. In such way, the purpose of transporting the fluid is achieved.

The piezoelectric actuator 102 and the substrate 101 of the fluid control device 100 are both flat-plate structures with certain rigidities. Thus, it is difficult to precisely align these two flat-plate structures to make the specified gap 103 and maintain it. If the gap 103 was not maintained in the specified depth, an assembling error would occur. Further explanation is exemplified as below. Referring to FIG. 1B, the piezoelectric actuator 102 is inclined at an angle θ by one side as a pivot. Most regions of the piezoelectric actuator 102 deviate from the expected horizontal position by an offset, and the offset of each point of the regions is correlated positively with its parallel distance to the pivot. In other words, slight deflection can cause a certain amount of deviation. As shown in FIG. 1B, one indicated region of the piezoelectric actuator 102 deviates from the standard by d while another indicated region can deviate by d'. As the fluid control device is developed toward miniaturization, miniature components are adopted. Consequently, the difficulty of maintaining the specified depth of the gap 103 has increased. The failure of maintaining the depth of the gap 103 causes several problems. For example, if the gap 103 is increased by d', the fluid transportation efficiency is reduced. On the other hand, if the gap 103 is decreased by d', the distance of the gap 103 is shortened and is unable to prevent the piezoelectric actuator 102 from readily being contacted or interfered by other components during operation. Under this circumstance, noise is generated, and the performance of the fluid control device is reduced.

Since the piezoelectric actuator 102 and the substrate 101 of the fluid control device 100 are flat-plate structures with certain rigidities, it is difficult to precisely align these two flat-plate structures. Especially when the sizes of the components are gradually decreased, the difficulty of precisely aligning the miniature components is largely enhanced. Under this circumstance, the performance of transferring the fluid is deteriorated, and the unpleasant noise is generated.

Therefore, there is a need of providing an improved fluid control device in order to eliminate the above drawbacks.

SUMMARY OF THE INVENTION

The present invention provides a fluid control device. The fluid control device has a miniature substrate and a miniature piezoelectric actuator. Since the substrate is deformable, a specified depth between a flexible plate of the substrate and a vibration plate of the piezoelectric actuator is maintained. Consequently, the assembling error is reduced, the efficiency of transferring the fluid is enhanced, and the noise is reduced. That is, the fluid control device of the present invention is more user-friendly.

In accordance with an aspect of the present invention, there is provided a fluid control device. The fluid control device includes a piezoelectric actuator and a deformable substrate. The piezoelectric actuator includes a piezoelectric element and a vibration plate. The piezoelectric element is attached on a surface of the vibration plate. The piezoelectric element is subjected to deformation in response to an applied voltage. The vibration plate is subjected to a curvy vibration in response to the deformation of the piezoelectric element. The deformable substrate includes a flexible plate and a communication plate. The flexible plate and the communication plate are stacked on each other. Consequently, a synchronously-deformed structure is formed and defined by the flexible plate and the communication plate collaboratively. The deformable substrate is combined with and positioned on the vibration plate of the piezoelectric actuator. Consequently, there is a specified depth between the flexible plate of the deformable substrate and the vibration plate. The flexible plate includes a movable part corresponding to the vibration plate.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The present invention provides a fluid control device. The fluid control device can be used in many sectors such as pharmaceutical industries, energy industries computer techniques or printing industries for transporting fluids.

Figure 2A:
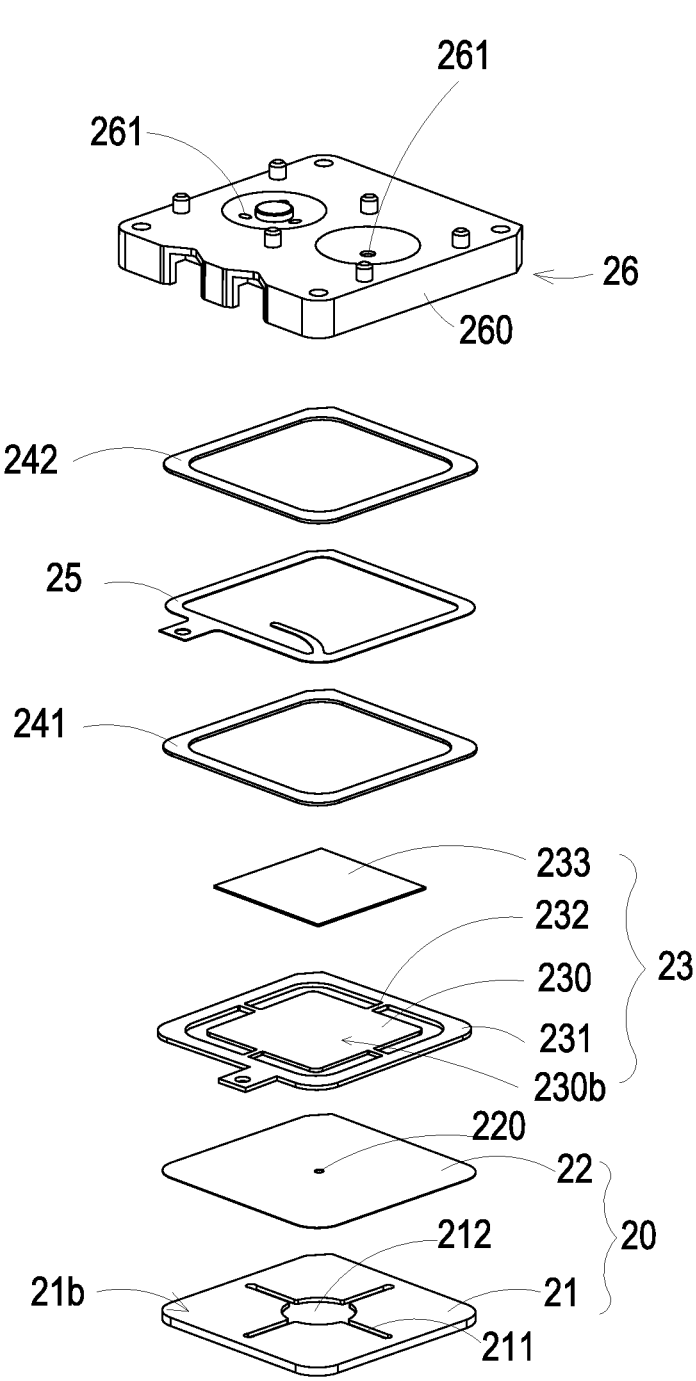
FIG. 2A is a schematic exploded view illustrating a fluid control device according to an embodiment of the present invention and taken along a first viewpoint.
Figure 2B:
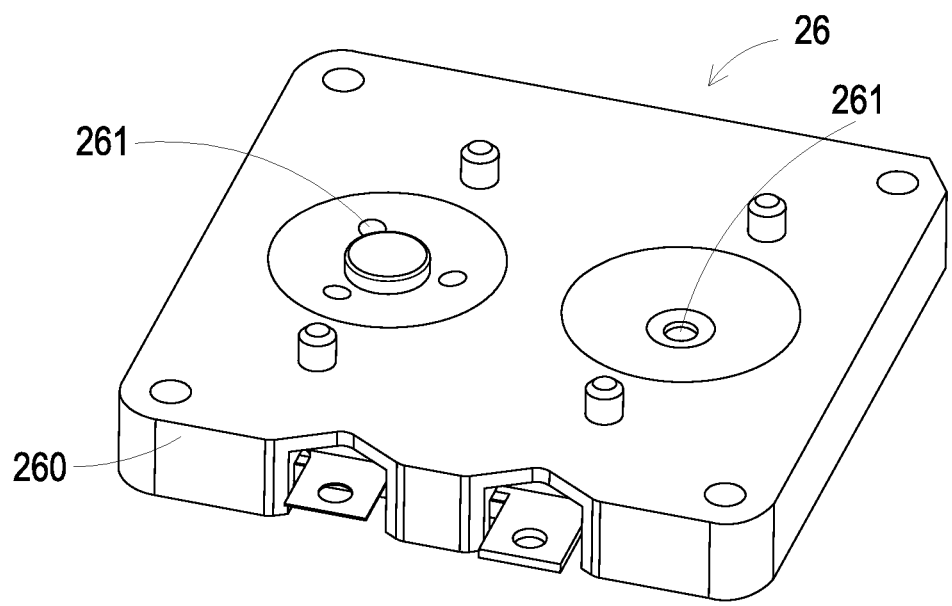
FIG. 2B is a schematic perspective view illustrating the assembled structure of the fluid control device of FIG. 2A.
Figure 3:
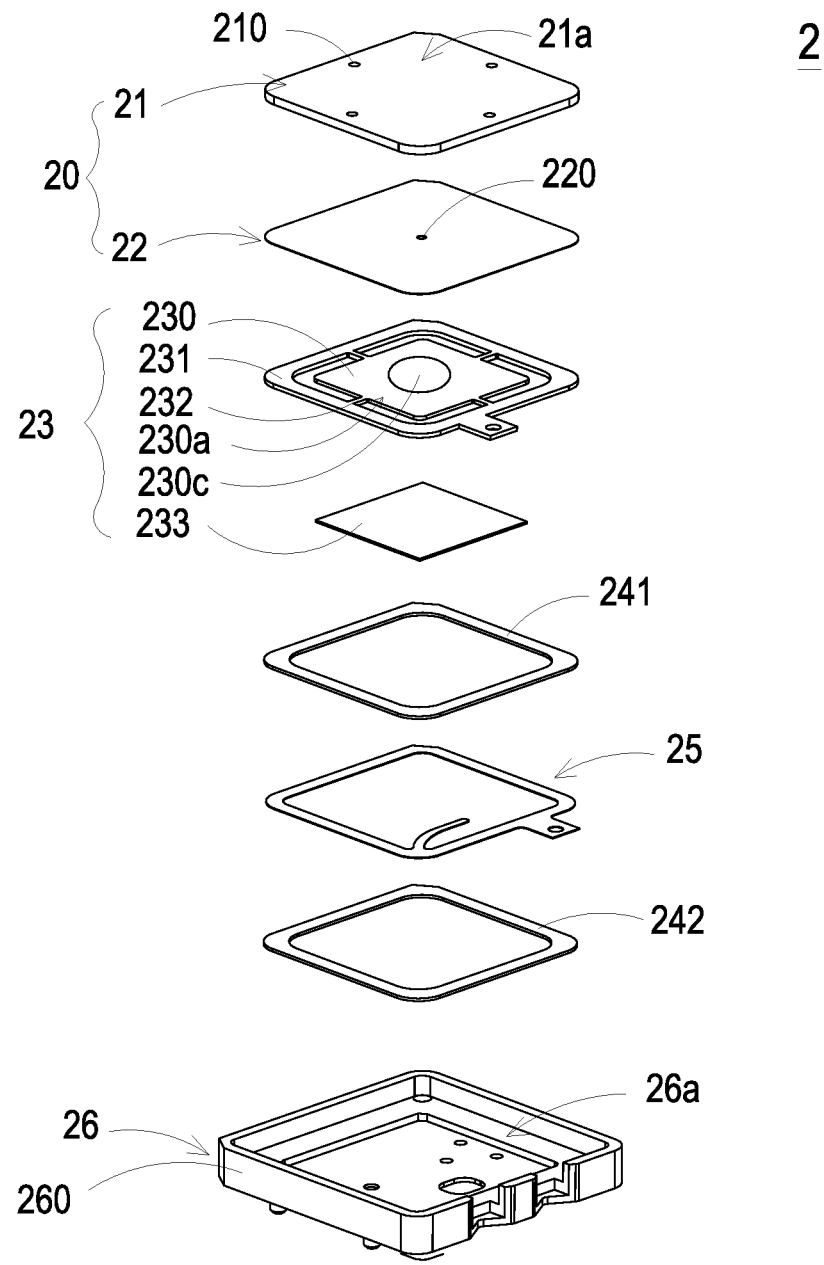
FIG. 3 is a schematic exploded view illustrating the fluid control device of FIG. 2A and taken along a second viewpoint.
Figure 4A:
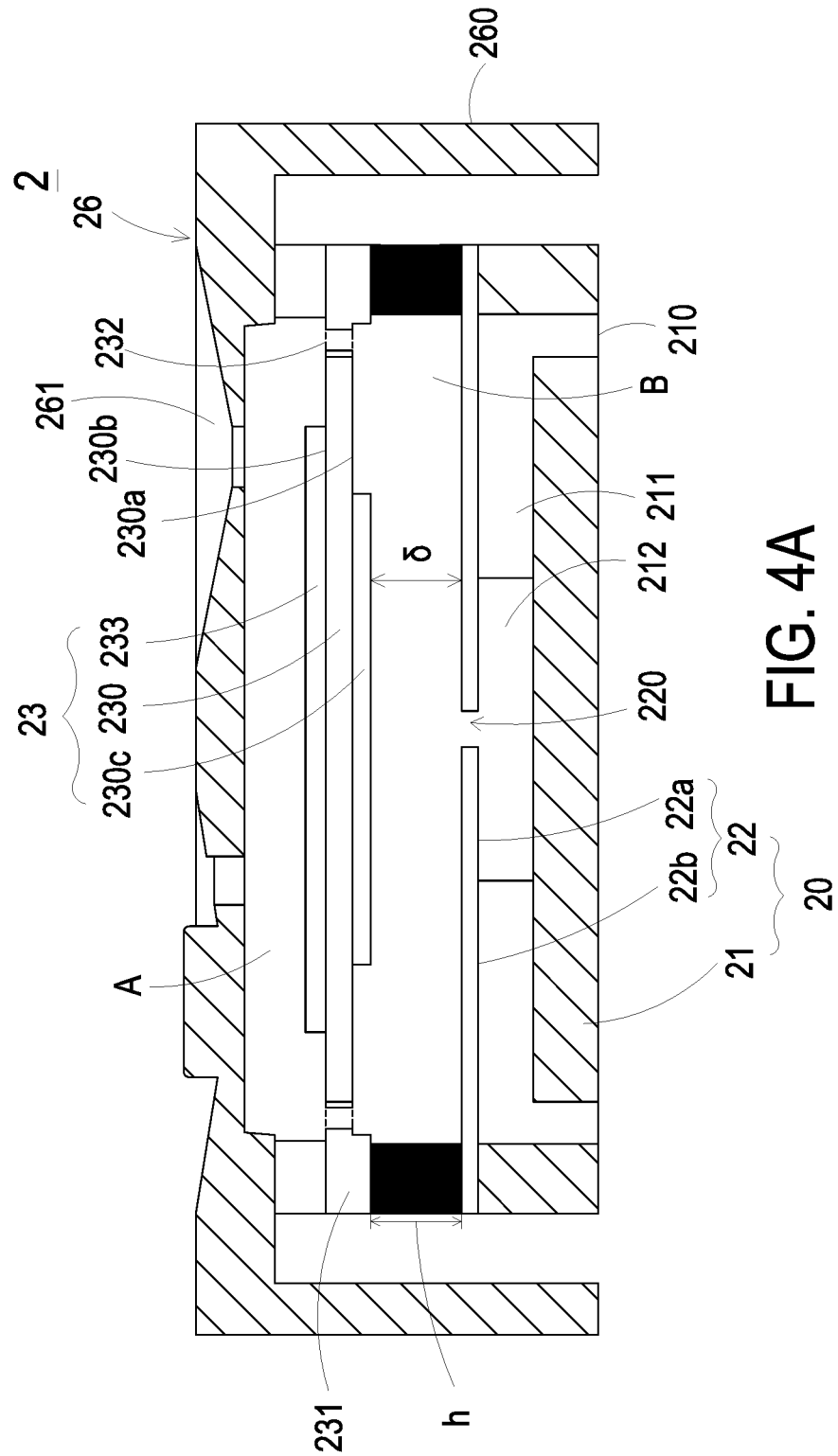
FIG. 4A is a schematic cross-sectional view of the fluid control device of FIG. 2A.

Please refer to FIGS. 2A, 2B, 3 and 4A. FIG. 2A is a schematic exploded view illustrating a fluid control device according to an embodiment of the present invention and taken along a first viewpoint. FIG. 2B is a schematic perspective view illustrating the assembled structure of the fluid control device of FIG. 2A. FIG. 3 is a schematic exploded view illustrating the fluid control device of FIG. 2A and taken along a second viewpoint. FIG. 4A is a schematic cross-sectional view of the fluid control device of FIG. 2A.

As shown in FIGS. 2A and 3, the fluid control device 2 comprises a deformable substrate 20, a piezoelectric actuator 23, a first insulating plate 241, a conducting plate 25, a second insulating plate 242 and a housing 26. The deformable substrate 20 comprises a communication plate 21 and a flexible plate 22. The piezoelectric actuator 23 is aligned with the flexible plate 22. The piezoelectric actuator 23 comprises a vibration plate 230 and a piezoelectric element 233. Moreover, the deformable substrate 20, the piezoelectric actuator 23, the first insulating plate 241, the conducting plate 25 and the second insulating plate 242 are sequentially stacked on each other, and received within the housing 26.

Please refer to FIGS. 2A, 2B, 3 and 4A again. The communication plate 21 has an inner surface 21b and an outer surface 21a. The inner surface 21b and the outer surface 21a are opposed to each other. As shown in FIG. 3, at least one inlet 210 is formed on the outer surface 21a of the communication plate 21. In this embodiment, four inlets 210 are formed on the outer surface 21a of the communication plate 21. It is noted that the number of the inlets 210 may be varied according to the practical requirements. The inlets 210 run through the inner surface 21b and the outer surface 21a of the communication plate 21. In response to the action of the atmospheric pressure, the fluid can be introduced into the fluid control device 2 through the at least one inlet 210. As shown in FIG. 2A, at least one convergence channel 211 is formed on the inner surface 21b of the communication plate 21. The at least one convergence channel 211 is in communication with the at least one inlet 210 running through the outer surface 21a of the communication plate 21. Moreover, a central cavity 212 is formed on the inner surface 21b of the communication plate 21. The central cavity 212 is in communication with the at least one convergence channel 211. After an external fluid is introduced into the fluid control device 2 via the at least one inlet 210, the fluid is guided through the at least one convergence channel 211 to the central cavity 212. Consequently, the fluid can be further transferred downwardly. In this embodiment, the at least one inlet 210, the at least one convergence channel 211 and the central cavity 212 of the communication plate 21 are integrally formed. The central cavity 212 forms a convergence chamber for temporarily storing the fluid. Preferably but not restricted, the communication plate 21 is made of stainless steel, and the flexible plate 22 is made of a flexible material. The flexible plate 22 comprises a central aperture 220 corresponding to the central cavity 212 of the communication plate 21. Consequently, the fluid can be transferred downwardly through the central aperture 220. Preferably but not exclusively, the flexible plate 22 is made of copper. The flexible plate 22 is coupled with the communication plate 21 and comprises a movable part 22a and a fixed part 22b. The fixed part 22b is connected with and fixed on the communication plate 21, whereas the movable part 22a is aligned with the central cavity 212. The central aperture 220 is formed in the movable part 22a.

Please refer to FIGS. 2A, 2B and 3 again. The piezoelectric actuator 23 comprises a piezoelectric element 233, a vibration plate 230, an outer frame 231 and at least one bracket 232. In this embodiment, the vibration plate 230 has a square flexible film structure. The vibration plate 230 has a first surface 230b and an opposing second surface 230a. The piezoelectric element 233 has a square shape. The side length of the piezoelectric element 233 is not larger than the side length of the vibration plate 230. Moreover, the piezoelectric element 233 is attached on the first surface 230b of the vibration plate 230. By applying a voltage to the piezoelectric element 233, the piezoelectric element 233 is subjected to deformation to result in curvy vibration of the vibration plate 230. Moreover, a bulge 230c is formed on the second surface 230a of the vibration plate 230. For example, the bulge 230c is a circular convex structure. The vibration plate 230 is enclosed by the outer frame 231. The profile of the outer frame 231 matches the profile of the vibration plate 230. That is, the outer frame 231 is a square hollow frame. Moreover, the at least one bracket 232 is connected between the vibration plate 230 and the outer frame 231 for elastically supporting the vibration plate 230.

As shown in FIGS. 2A, 2B and FIG. 3, the housing 26 comprises at least one outlet 261. The housing 26 comprises a bottom plate and a sidewall structure 260. The sidewall structure 260 extends from the peripheral of the bottom plate. An accommodation space 26a is defined by the bottom plate and the sidewall structure 260 collaboratively. The piezoelectric actuator 23 is disposed within the accommodation space 26a. After the fluid control device 2 is assembled, the assembled structure of the fluid control device 2 is shown in FIGS. 2B and 4A. The piezoelectric actuator 23 and the deformable substrate 20 are covered by the housing 26. In addition, a temporary storage chamber A is formed between the housing 26 and the piezoelectric actuator 23 for temporarily storing the fluid. The outlet 261 is in communication with the temporary storage chamber A. Consequently, the fluid can be discharged from the housing 26 through the outlet 261.

Figure 4B:
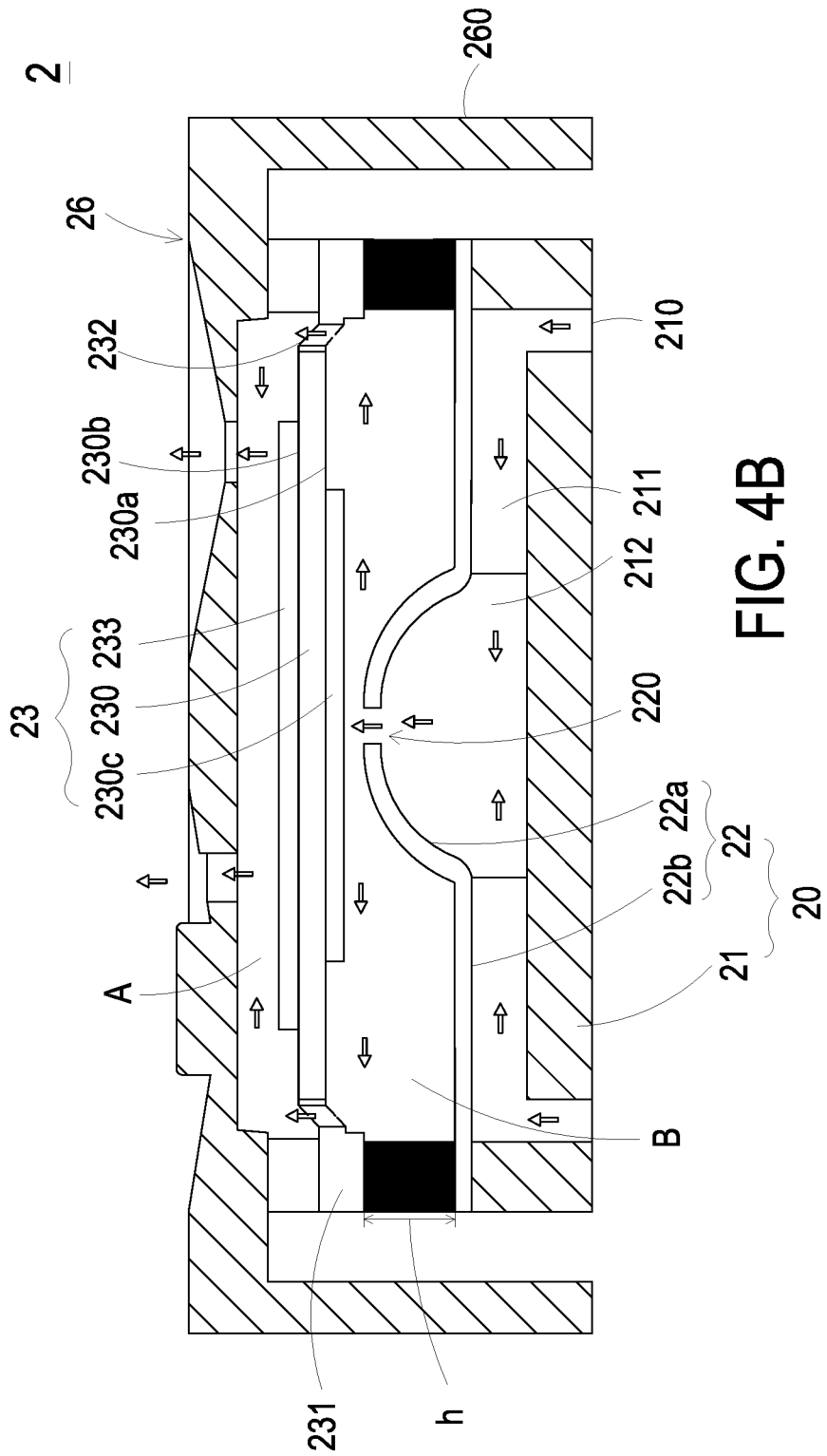
FIGS. 4B and 4C are schematic cross-sectional views illustrating the actions of the fluid control device of FIG. 2A.
Figure 4C:
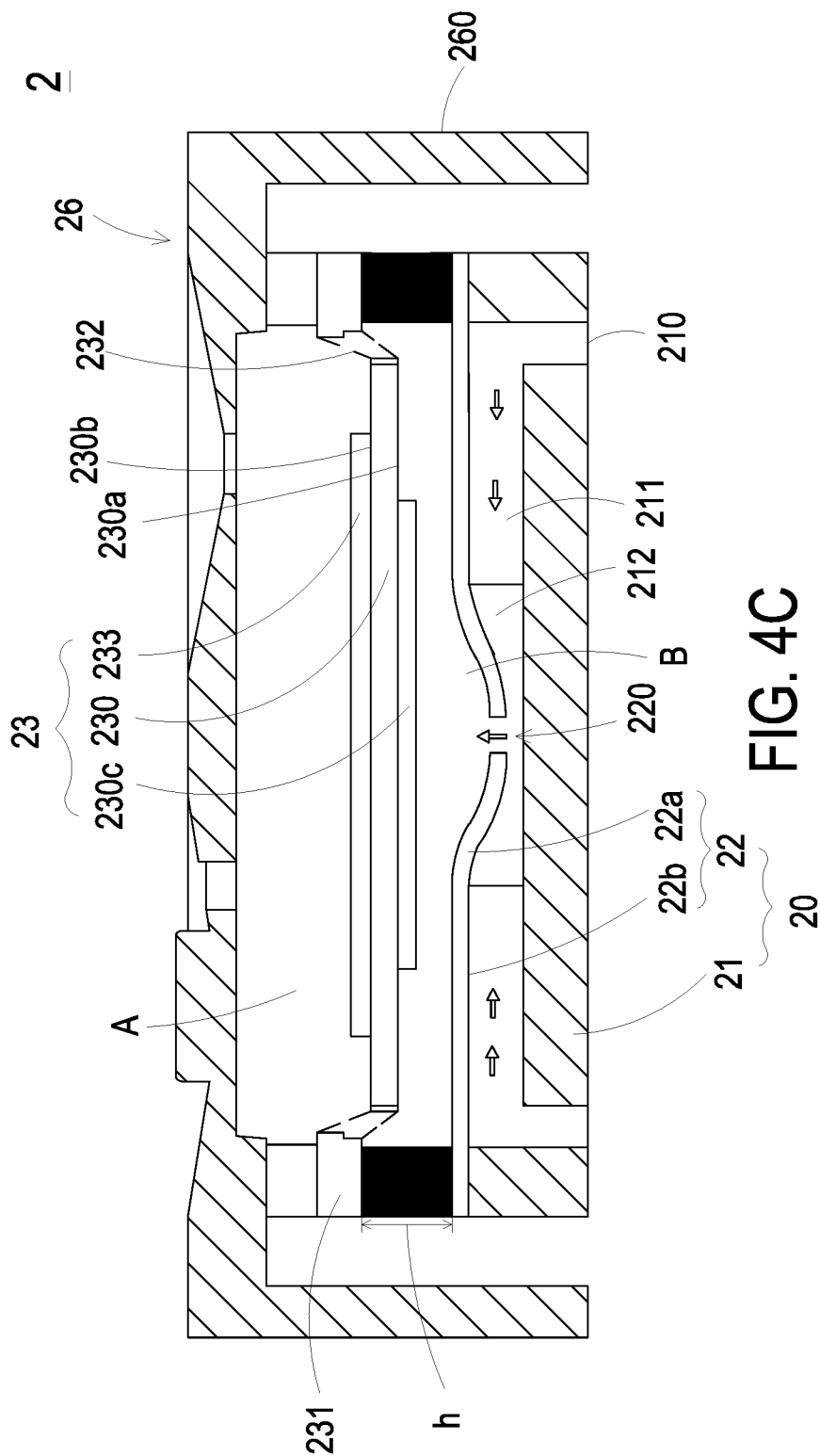

FIG. 4A is a schematic cross-sectional view of the fluid control device of FIG. 2A. FIGS. 4B and 4C are schematic cross-sectional views illustrating the actions of the fluid control device of FIG. 2A. For succinctness, the first insulating plate 241, the conducting plate 25 and the second insulating plate 242 are not shown in FIGS. 4A, 4B and 4C. Moreover, the deformable substrate 20 shown in FIGS. 4A, 4B and 4C has not subjected to synchronous deformation yet. These drawings are employed to indicate the relationship and interactions between the communication plate 21 and the flexible plate 22 of the deformable substrate 20 and the piezoelectric actuator 23.

Please refer to FIG. 4A. After the communication plate 21, the flexible plate 22 and the piezoelectric actuator 23 are combined together, a convergence chamber is defined by partial flexible plate 22 including the central aperture 220 and the central cavity 212 of the communication plate 21 collaboratively. There is a gap h between the flexible plate 22 and the outer frame 231 of the piezoelectric actuator 23. Preferably but not exclusively, a medium (e.g., a conductive adhesive) is filled in the gap h. Consequently, the flexible plate 22 and the outer frame 231 of the piezoelectric actuator 23 are connected with each other through the medium and form a compressible chamber B therebetween. At the same time, there is a specified depth δ between the flexible plate 22 and the bulge 230c of the piezoelectric actuator 23. When the vibration plate 230 of the piezoelectric actuator 23 vibrates, the fluid in the compressible chamber B is compressed and the specified depth δ reduces. Consequently, the pressure and the flow rate of the fluid are increased. In addition, the specified depth δ is a proper distance that is sufficient to prevent the contact interference between the flexible plate 22 and the piezoelectric actuator 23 and therefore reduce the noise generation. Moreover, the convergence chamber defined by the flexible plate 22 and the central cavity 212 of the communication plate 21 is in communication with the compressible chamber B.

When the fluid control device 2 is enabled, the piezoelectric actuator 23 is actuated in response to an applied voltage. Consequently, the piezoelectric actuator 23 vibrates along a vertical direction in a reciprocating manner. Please refer to FIG. 4B. When the piezoelectric actuator 23 vibrates upwardly, since the flexible plate 22 is light and thin, the flexible plate 22 vibrates simultaneously because of the resonance of the piezoelectric actuator 23. More especially, the movable part 22a of the flexible plate 22 is subjected to a curvy deformation. The central aperture 220 is located near or located at the center of the flexible plate 22. Since the piezoelectric actuator 23 vibrates upwardly, the movable part 22a of the flexible plate 22 correspondingly moves upwardly, making an external fluid introduced by the at least one inlet 210, through the at least one convergence channel 211, into the convergence chamber. After that, the fluid is transferred upwardly to the compressible chamber B through the central aperture 220 of the flexible plate 22. As the flexible plate 22 is subjected to deformation, the volume of the compressible chamber B is compressed so as to enhance the kinetic energy therein and make it flow to the bilateral sides, then transferred upwardly through the vacant space between the vibration plate 230 and the bracket 232.

Please refer to FIG. 4C. As the piezoelectric actuator 23 vibrates downwardly, the movable part 22a of the flexible plate 22 is correspondingly moved downwardly and subjected to the downward curvy deformation because of the resonance of the piezoelectric actuator 23. Meanwhile, less fluid is converged to the convergence chamber in the central cavity 212 of the communication plate 21. Since the piezoelectric actuator 23 vibrates downwardly, the volume of the compressible chamber B increases.

The step of FIG. 4B and the step of FIG. 4C are repeatedly done so as to expand or compress the compressible chamber B, thus enlarging the amount of inhalation or discharge of the fluid.

The deformable substrate 20 comprises the communication plate 21 and the flexible plate 22. The communication plate 21 and the flexible plate 22 are stacked on each other and subjected to synchronously deformation so that forming a synchronously-deformed structure, which is defined by the communication plate 21 and the flexible plate 22 collaboratively. Specifically, the synchronously-deformed structure is defined by a synchronously-deformed region of the communication plate 21 and a synchronously-deformed region of the flexible plate 22 collaboratively. When one of the communication plate 21 and the flexible plate 22 is subjected to deformation, anther is also subjected to deformation synchronously. Moreover, the deformation shape of the communication plate 21 and the deformation shape of the flexible plate 22 are identical. As a result, after the corresponding surfaces of the communication plate 21 and the flexible plate 22 are contacted with and positioned on each other, there is merely little interval or parallel offset happened therebetween. Preferably but not exclusively, the communication plate 21 and the flexible plate 22 are contacted with each other through a binder.

Figure 1A:
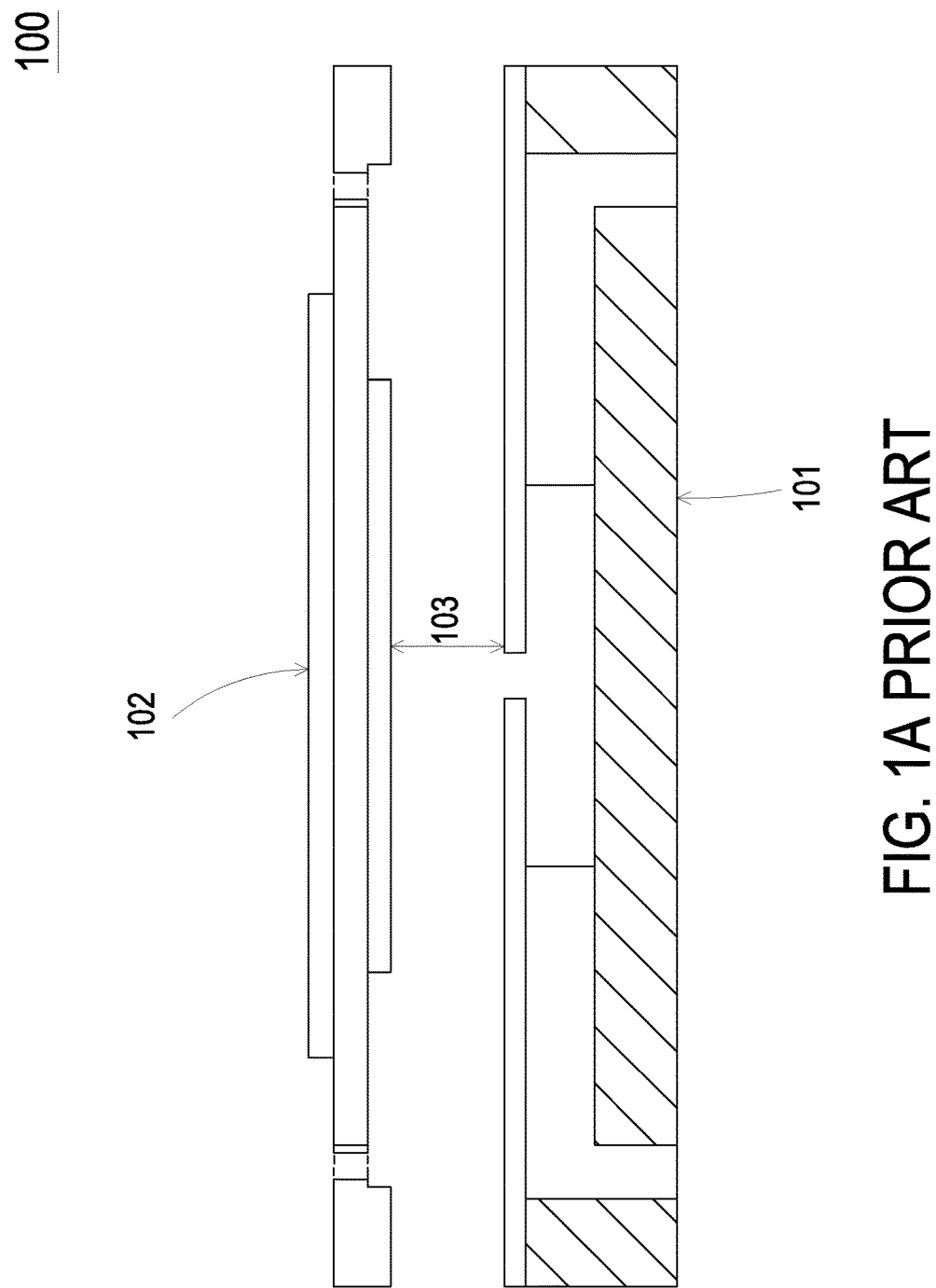
FIG. 1A is a schematic cross-sectional view illustrating a portion of a conventional fluid control device.
Figure 1B:
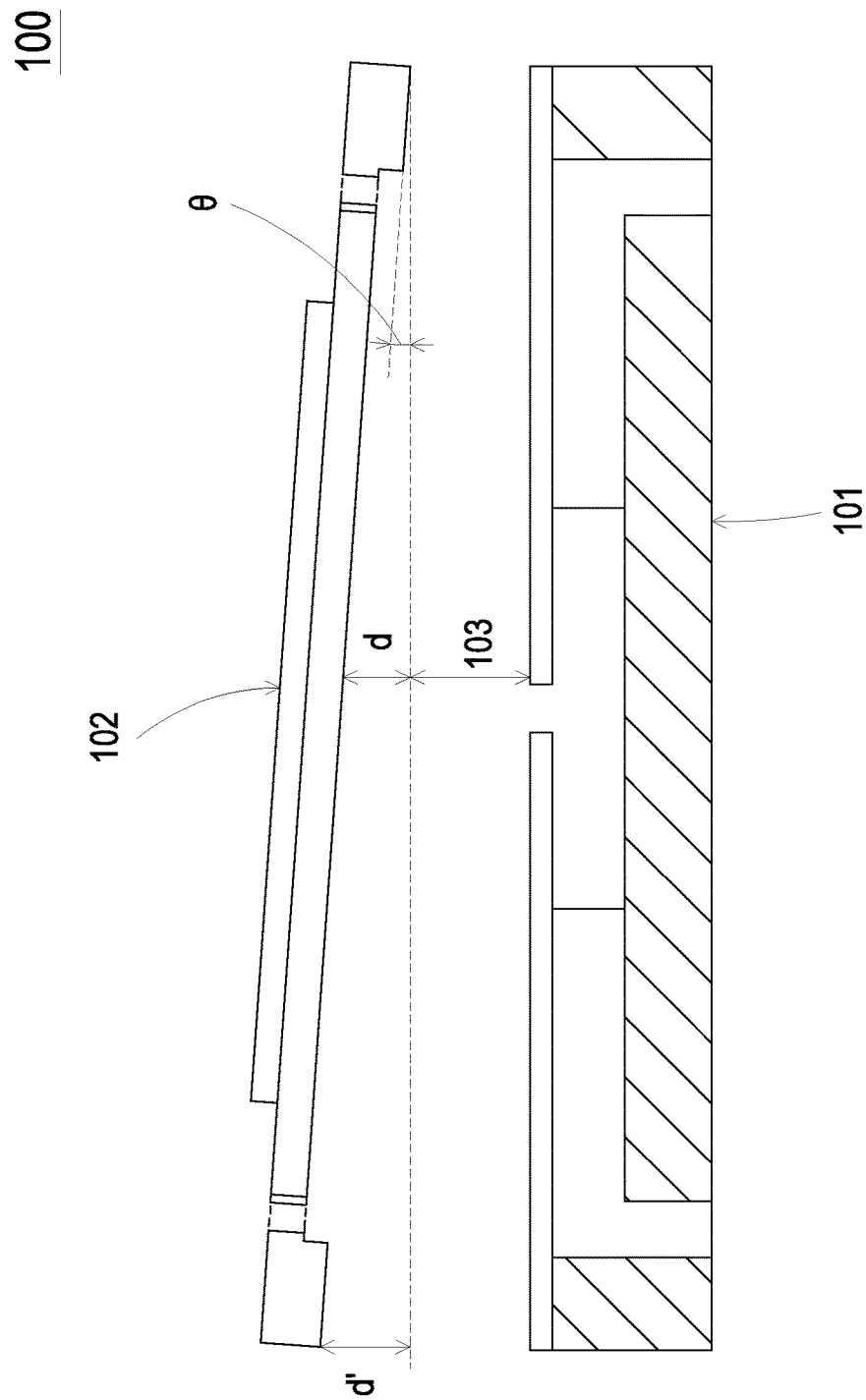
FIG. 1B is a schematic cross-sectional view illustrating an assembling shift condition of the conventional fluid control device.

As mentioned in FIG. 1B, the piezoelectric actuator 102 and the substrate 101 of the conventional fluid control device 100 are flat-plate structures with certain rigidities. Consequently, it is difficult to precisely align these two flat-plate structures and make them separated by the specified gap 103 (i.e., maintain the specified depth). That is, the misalignment of the piezoelectric actuator 102 and the substrate 101 readily occurs. In accordance with the present invention, the synchronously-deformed structure of the deformable substrate 20 is defined in response to the synchronous deformation of the communication plate 21 and the flexible plate 22. Moreover, the function of the synchronously-deformed structure is similar to the function of the substrate 101 of the conventional technology. More especially, the synchronously-deformed structure defined by the communication plate 21 and the flexible plate 22 has various implementation examples. In these implementation examples, a compressible chamber B corresponding to the specified depth δ (i.e., a specified gap between the synchronously-deformed structure and the vibration plate 230 of the piezoelectric actuator 23) is maintained according to the practical requirements. Consequently, the fluid control device 2 is developed toward miniaturization, and the miniature components are adopted. Due to the synchronously-deformed structure, it is easy to maintain the specified gap between the deformable substrate and the vibration plate. As previously described, the conventional technology has to precisely align two large-area flat-plate structures. In accordance with the feature of the present invention, the area to be aligned reduces because the deformable substrate 20' has the synchronously-deformed structure and is a non-flat-plate structure. The shape of the synchronously-deformed structure is not restricted. For example, the synchronously-deformed structure has a curvy shape, a conical shape, a curvy-surface profile or an irregular shape. Compared with aligning two large areas of the two flat plates, aligning one small area of a non-flat-plate with a flat plate is much easier, and therefore reduces assembling errors. Under this circumstance, the performance of transferring the fluid is enhanced and the noise is reduced.

In some embodiments, the synchronously-deformed structure is defined by the entire communication plate 21 and the entire flexible plate 22 collaboratively. In these cases, the synchronously-deformed region of the flexible plate 22 includes the movable part 22a and the region beyond the movable part 22a. In addition, the synchronously-deformed structure of the deformable substrate 20 includes but not limited to a curvy structure, a conical structure and a convex structure. Some examples of the synchronously-deformed structure of the deformable substrate of the fluid control device will be described as follows.

Figure 5A:
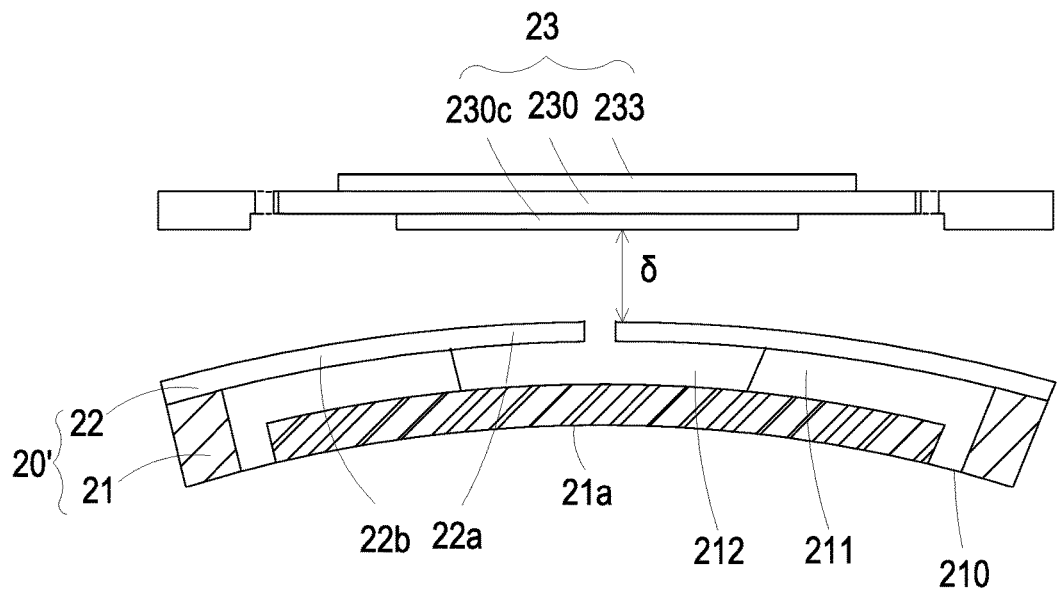
FIG. 5A is a schematic cross-sectional view illustrating a first example of the synchronously-deformed structure of the deformable substrate of the fluid control device.
Figure 5B:
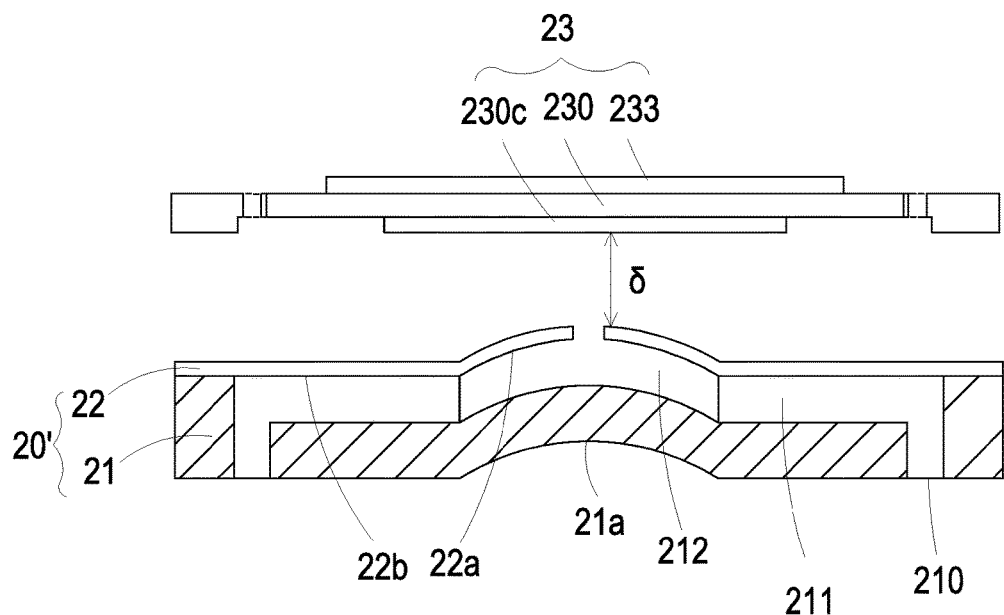
FIG. 5B is a schematic cross-sectional view illustrating a second example of the synchronously-deformed structure of the deformable substrate of the fluid control device.
Figure 5C:
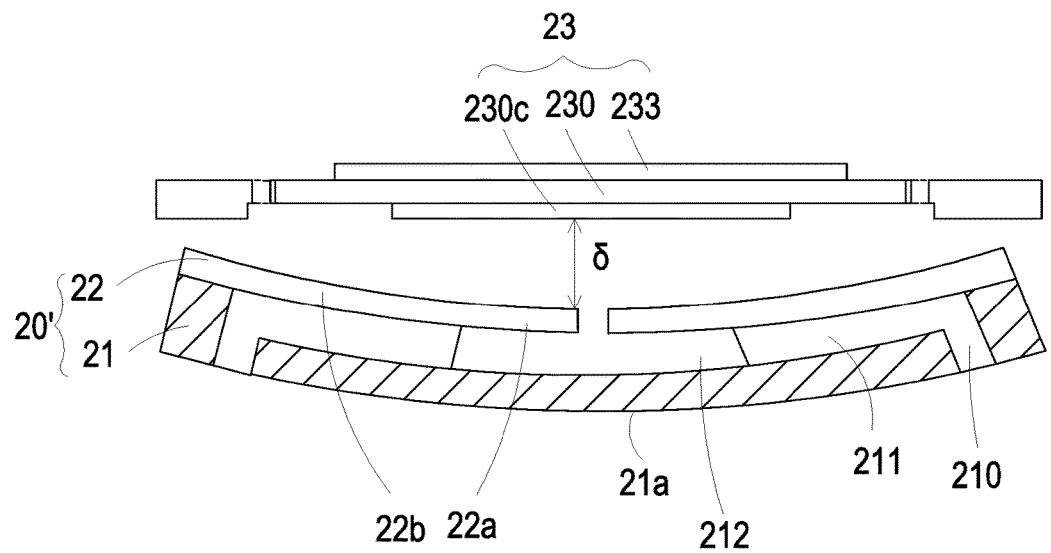
FIG. 5C is a schematic cross-sectional view illustrating a third example of the synchronously-deformed structure of the deformable substrate of the fluid control device.

Please refer to FIGS. 5A and 5C. FIG. 5A is a schematic cross-sectional view illustrating a first example of the synchronously-deformed structure of the deformable substrate of the fluid control device. FIG. 5C is a schematic cross-sectional view illustrating a third example of the synchronously-deformed structure of the deformable substrate of the fluid control device. In the examples of FIGS. 5A and 5C, the synchronously-deformed structure is defined by the entire communication plate 21 and the entire flexible plate 22 collaboratively. That is, the synchronously-deformed region of the flexible plate 22 includes the movable part 22a and the region beyond the movable part 22a. The deformation direction of the example of FIG. 5A and the deformation direction of the example of FIG. 5C are opposite. As shown in FIG. 5A, the outer surface 21a of the communication plate 21 of the deformable substrate 20' is bent in the direction toward the bulge 230c of the vibration plate 230. Moreover, the movable part 22a and the region beyond the movable part 22a of the flexible plate 22 are also bent in the direction toward the bulge 230c of the vibration plate 230. The bent communication plate 21 and the bent flexible plate 22 define the synchronously-deformed structure of the deformable substrate 20'. As shown in FIG. 5C, the outer surface 21a of the communication plate 21 of the deformable substrate 20' is bent in the direction away from the bulge 230c of the vibration plate 230. Simultaneously, the movable part 22a and the region beyond the movable part 22a of the flexible plate 22 are also bent in the direction away from the bulge 230c of the vibration plate 230. The bent communication plate 21 and the bent flexible plate 22 define the synchronously-deformed structure of the deformable substrate 20'. Under this circumstance, the specified depth δ between the flexible plate 22 and the bulge 230c of the vibration plate 230 is maintained. That is, the specified depth δ is maintained between the flexible plate 22 and the bulge 230c of the vibration plate 230, more particularly between the movable part 22a and the bulge 230c of the vibration plate 230. Consequently, the fluid control device 2 with the synchronously-deformed structure is produced.

Figure 6A:
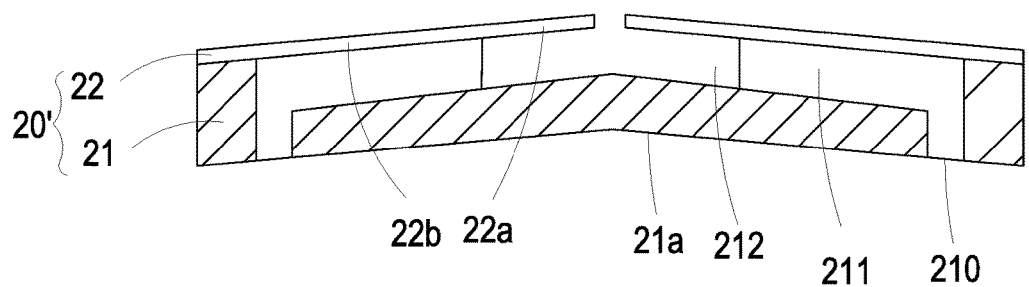
FIG. 6A is a schematic cross-sectional view illustrating a fifth example of the synchronously-deformed structure of the deformable substrate of the fluid control device.
Figure 6B:
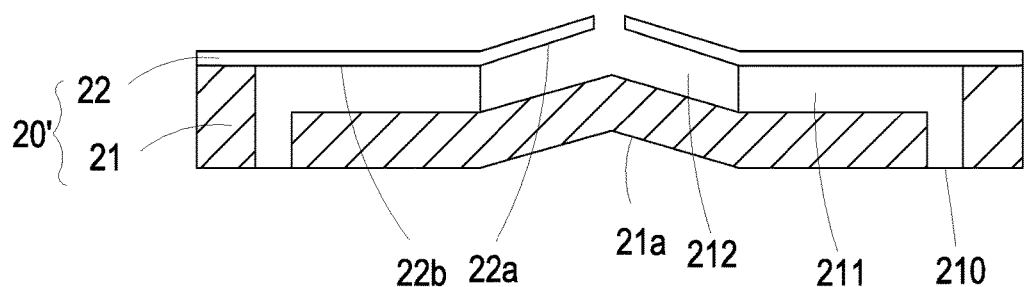
FIG. 6B is a schematic cross-sectional view illustrating a sixth example of the synchronously-deformed structure of the deformable substrate of the fluid control device.
Figure 6C:
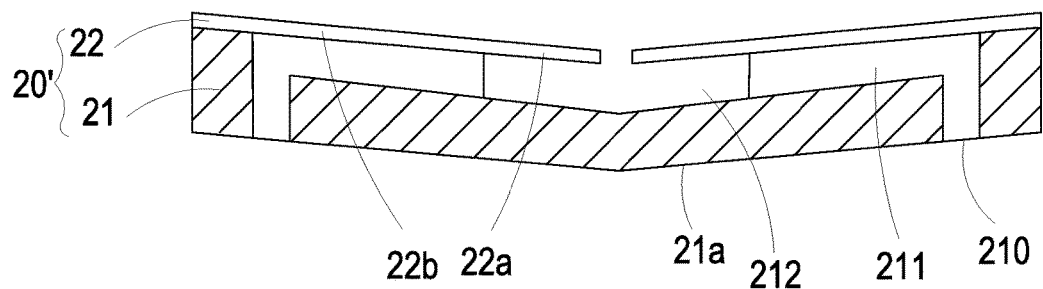
FIG. 6C is a schematic cross-sectional view illustrating a seventh example of the synchronously-deformed structure of the deformable substrate of the fluid control device.

Please refer to FIGS. 6A and 6C. FIG. 6A is a schematic cross-sectional view illustrating a fifth example of the synchronously-deformed structure of the deformable substrate of the fluid control device. FIG. 6C is a schematic cross-sectional view illustrating a seventh example of the synchronously-deformed structure of the deformable substrate of the fluid control device. In the examples of FIGS. 6A and 6C, the synchronously-deformed structure is a conical synchronously-deformed structure that is defined by the entire communication plate 21 and the entire flexible plate 22 collaboratively. That is, the synchronously-deformed region of the flexible plate 22 includes the region of the movable part 22a and the region beyond the movable part 22a. The deformation direction of the example of FIG. 6A and the deformation direction of the example of FIG. 6C are opposite. As shown in FIG. 6A, the outer surface 21a of the communication plate 21 of the deformable substrate 20' is bent in the direction toward the bulge 230c of the vibration plate 230. Moreover, the region of the movable part 22a and the region beyond the movable part 22a of the flexible plate 22 are also bent in the direction toward the bulge 230c of the vibration plate 230. As a consequence, the conical synchronously-deformed structure of the deformable substrate 20' is defined. As shown in FIG. 6C, the outer surface 21a of the communication plate 21 of the deformable substrate 20' is bent in the direction away from the bulge 230c of the vibration plate 230. Moreover, the region of the movable part 22a and the region beyond the movable part 22a of the flexible plate 22 are also bent away from the bulge 230c of the vibration plate 230. As a consequence, the conical synchronously-deformed structure of the deformable substrate 20' is defined. Under this circumstance, the specified depth δ is maintained between the movable part 22a of the flexible plate 22 and the bulge 230c of the vibration plate 230. Consequently, the fluid control device 2 with the conical synchronously-deformed structure is produced.

Figure 7A:
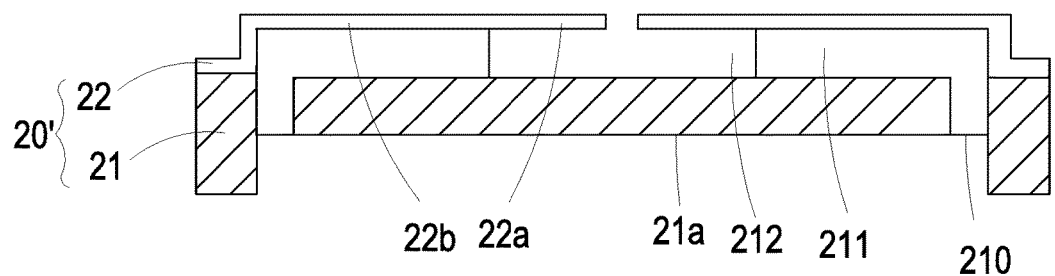
FIG. 7A is a schematic cross-sectional view illustrating a ninth example of the synchronously-deformed structure of the deformable substrate of the fluid control device.
Figure 7B:
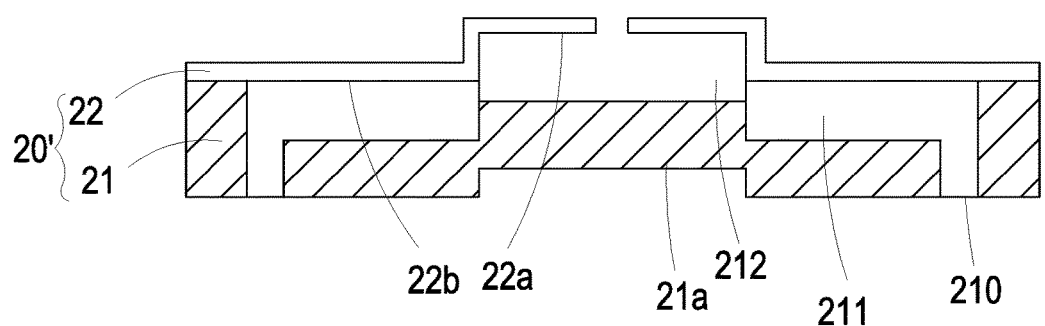
FIG. 7B is a schematic cross-sectional view illustrating a tenth example of the synchronously-deformed structure of the deformable substrate of the fluid control device.
Figure 7C:
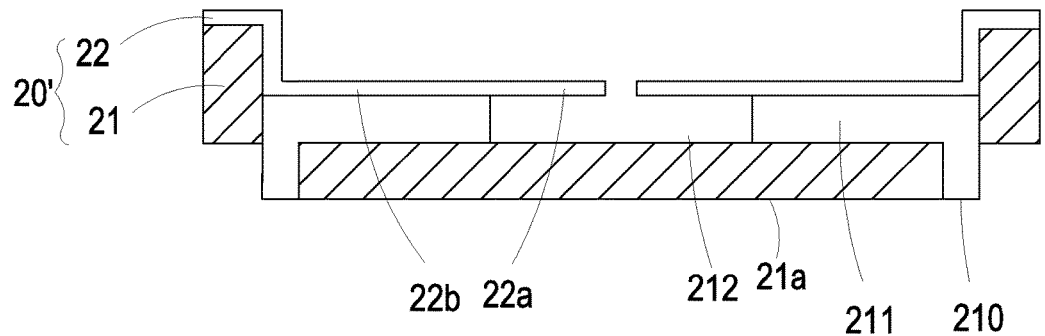
FIG. 7C is a schematic cross-sectional view illustrating an eleventh example of the synchronously-deformed structure of the deformable substrate of the fluid control device.

Please refer to FIGS. 7A and 7B. FIG. 7A is a schematic cross-sectional view illustrating a ninth example of the synchronously-deformed structure of the deformable substrate of the fluid control device. FIG. 7C is a schematic cross-sectional view illustrating an eleventh example of the synchronously-deformed structure of the deformable substrate of the fluid control device. In the examples of FIGS. 7A and 7C, the synchronously-deformed structure is a convex synchronously-deformed structure that is defined by the entire communication plate 21 and the entire flexible plate 22 collaboratively. That is, the synchronously-deformed region of the flexible plate 22 includes the region of the movable part 22a and the region beyond the movable part 22a. The deformation direction of the example of FIG. 7A and the deformation direction of the example of FIG. 7C are opposite. As shown in FIG. 7A, the outer surface 21a of the communication plate 21 of the deformable substrate 20' is bent in the direction toward the bulge 230c of the vibration plate 230. Moreover, the movable part 22a and the region beyond the movable part 22a of the flexible plate 22 are also bent in the direction toward the bulge 230c of the vibration plate 230. As a consequence, the convex synchronously-deformed structure of the deformable substrate 20' is defined. As shown in FIG. 7C, the outer surface 21a of the communication plate 21 of the deformable substrate 20' is bent in the direction away from the bulge 230c of the vibration plate 230. Moreover, the movable part 22a and the region beyond the movable part 22a of the flexible plate 22 are also bent in the direction away from the bulge 230c of the vibration plate 230. As a consequence, the convex synchronously-deformed structure of the deformable substrate 20' is defined. Under this circumstance, the specified depth δ is maintained between the movable part 22a of the flexible plate 22 and the bulge 230c of the vibration plate 230. Consequently, the fluid control device 2 with the convex synchronously-deformed structure is produced.

Alternatively, the synchronously-deformed structure is defined by a part of the communication plate 21 and a part of the flexible plate 22 collaboratively. That is, the synchronously-deformed region of the flexible plate 22 includes the region of the movable part 22a only, and the scale of the synchronously-deformed region of the communication plate 21 corresponds to the synchronously-deformed region of the flexible plate 22. In addition, the synchronously-deformed structure of the deformable substrate 20' includes but not limited to a curvy structure, a conical structure and a convex structure.

Figure 5D:
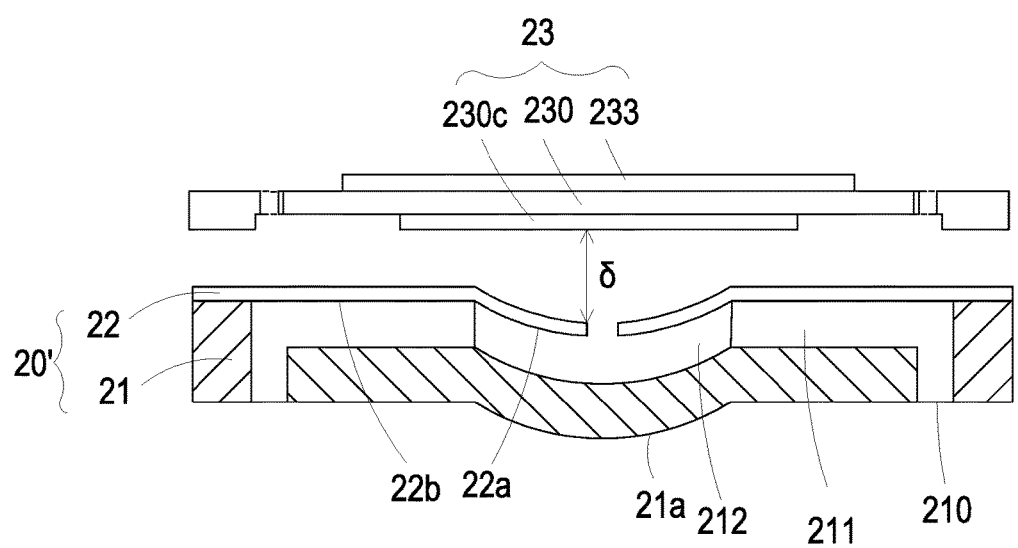
FIG. 5D is a schematic cross-sectional view illustrating a fourth example of the synchronously-deformed structure of the deformable substrate of the fluid control device.

Please refer to FIGS. 5B and 5D. FIG. 5B is a schematic cross-sectional view illustrating a second example of the synchronously-deformed structure of the deformable substrate of the fluid control device. FIG. 5D is a schematic cross-sectional view illustrating a fourth example of the synchronously-deformed structure of the deformable substrate of the fluid control device. In the examples of FIGS. 5B and 5D, the synchronously-deformed structure is defined by a part of the communication plate 21 and a part of the flexible plate 22 collaboratively. The synchronously-deformed region of the flexible plate 22 includes the region of the movable part 22a only, and the synchronously-deformed region of the communication plate 21 corresponds to the synchronously-deformed region of the flexible plate 22. That is, the synchronously-deformed structures of FIGS. 5B and 5D are produced by partially deforming the deformable substrate 20'. The deformation direction of the example of FIG. 5B and the deformation direction of the example of FIG. 5D are opposite. As shown in FIG. 5B, the outer surface 21a of the communication plate 21 of the deformable substrate 20' is partially bent in the direction toward the bulge 230c of the vibration plate 230. Moreover, the region of the movable part 22a of the flexible plate 22 is also partially bent in the direction toward the bulge 230c of the vibration plate 230. As a consequence, the partially-bent synchronously-deformed structure of the deformable substrate 20' is defined. As shown in FIG. 5D, the outer surface 21a of the communication plate 21 of the deformable substrate 20' is partially bent in the direction away from the bulge 230c of the vibration plate 230. Moreover, the region of the movable part 22a of the flexible plate 22 is also bent in the direction away from the bulge 230c of the vibration plate 230. As a consequence, the partially-bent synchronously-deformed structure of the deformable substrate 20' is defined. Under this circumstance, the specified depth δ is maintained between the movable part 22a of the flexible plate 22 and the bulge 230c of the vibration plate 230. Consequently, the fluid control device 2 with the partially-bent synchronously-deformed structure is produced.

Figure 6D:
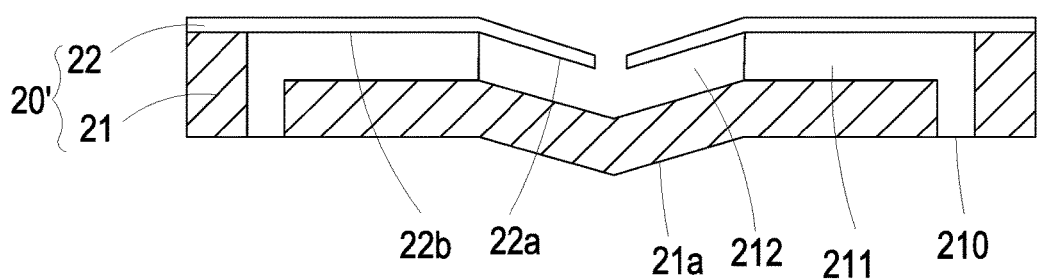
FIG. 6D is a schematic cross-sectional view illustrating an eighth example of the synchronously-deformed structure of the deformable substrate of the fluid control device.

Please refer to FIGS. 6B and 6D. FIG. 6B is a schematic cross-sectional view illustrating a sixth example of the synchronously-deformed structure of the deformable substrate of the fluid control device. FIG. 6D is a schematic cross-sectional view illustrating an eighth example of the synchronously-deformed structure of the deformable substrate of the fluid control device. In the examples of FIGS. 6B and 6D, the synchronously-deformed structure is defined by a part of the communication plate 21 and a part of the flexible plate 22 collaboratively. The synchronously-deformed region of the flexible plate 22 includes the region of the movable part 22a only, and the synchronously-deformed region of the communication plate 21 corresponds to the synchronously-deformed region of the flexible plate 22. That is, the synchronously-deformed structures of FIGS. 6B and 6D are produced by partially deforming the deformable substrates 20' to conical synchronously-deformed structures. The deformation direction of the example of FIG. 6B and the deformation direction of the example of FIG. 6D are opposite. As shown in FIG. 6B, the outer surface 21a of the communication plate 21 of the deformable substrate 20' is partially bent in the direction toward the bulge 230c of the vibration plate 230. Moreover, the region of the movable part 22a of the flexible plate 22 is also partially bent in the direction toward the bulge 230c of the vibration plate 230. As a consequence, the conical synchronously-deformed structure of the deformable substrate 20' is defined. As shown in FIG. 6D, the outer surface 21a of the communication plate 21 of the deformable substrate 20' is partially bent in the direction away from the bulge 230c of the vibration plate 230. Moreover, the region of the movable part 22a of the flexible plate 22 is also partially bent in the direction away from the bulge 230c of the vibration plate 230. As a consequence, the conical synchronously-deformed structure of the deformable substrate 20' is defined. Under this circumstance, the specified depth δ is maintained between the movable part 22a of the flexible plate 22 and the bulge 230c of the vibration plate 230. Consequently, the fluid control device 2 with the conical synchronously-deformed structure is produced.

Figure 7D:
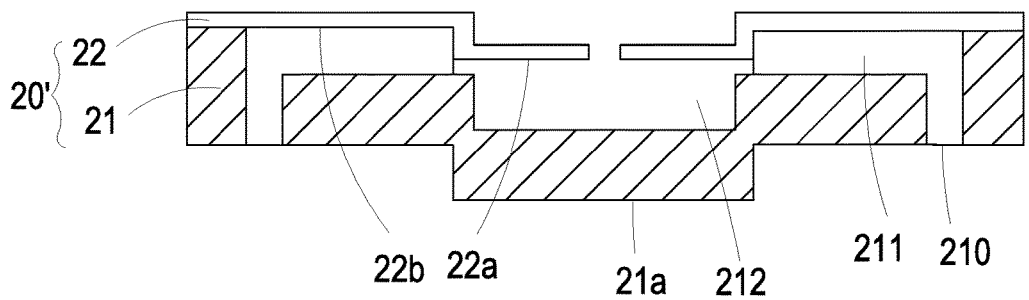
FIG. 7D is a schematic cross-sectional view illustrating a twelfth example of the synchronously-deformed structure of the deformable substrate of the fluid control device.

Please refer to FIGS. 7B and 7D. 7B is a schematic cross-sectional view illustrating a tenth example of the synchronously-deformed structure of the deformable substrate of the fluid control device. FIG. 7D is a schematic cross-sectional view illustrating a twelfth example of the synchronously-deformed structure of the deformable substrate of the fluid control device. In the examples of FIGS. 7B and 7D, the synchronously-deformed structure is defined by a part of the communication plate 21 and a part of the flexible plate 22 collaboratively. The synchronously-deformed region of the flexible plate 22 includes the region of the movable part 22a only, and the synchronously-deformed region of the communication plate 21 corresponds to the synchronously-deformed region of the flexible plate 22. That is, the synchronously-deformed structures of FIGS. 7B and 7D are produced by partially deforming the deformable substrates 20' to the convex synchronously-deformed structures. The deformation direction of the example of FIG. 7B and the deformation direction of the example of FIG. 7D are opposite. As shown in FIG. 7B, the outer surface 21a of the communication plate 21 of the deformable substrate 20' is partially bent in the direction toward the bulge 230c of the vibration plate 230. Moreover, the region of the movable part 22a of the flexible plate 22 is also partially bent in the direction toward the bulge 230c of the vibration plate 230. As a consequence, the convex synchronously-deformed structure of the deformable substrate 20' is defined. As shown in FIG. 7D, the outer surface 21a of the communication plate 21 of the deformable substrate 20' is partially bent in the direction away from the bulge 230c of the vibration plate 230. Moreover, the region of the movable part 22a of the flexible plate 22 is also bent in the direction away from the bulge 230c of the vibration plate 230. As a consequence, the convex synchronously-deformed structure of the deformable substrate 20' is defined. Under this circumstance, the specified depth δ is maintained between the movable part 22a of the flexible plate 22 and the bulge 230c of the vibration plate 230. Consequently, the fluid control device 2 with the convex synchronously-deformed structure is produced.

Figure 8:
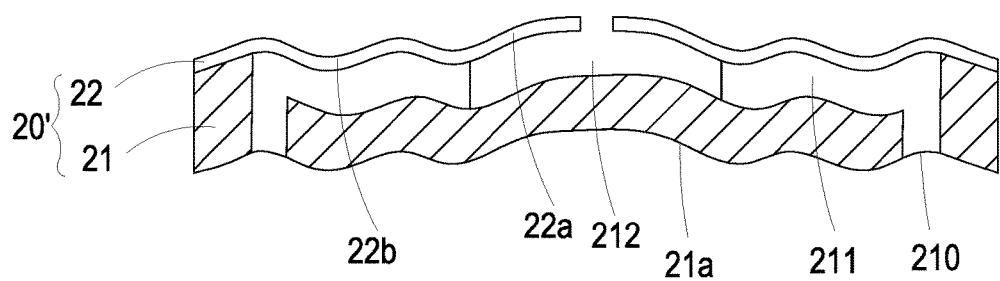
FIG. 8 is a schematic cross-sectional view illustrating a thirteenth example of the synchronously-deformed structure of the deformable substrate of the fluid control device.

FIG. 8 is a schematic cross-sectional view illustrating an example of the synchronously-deformed structure of the deformable substrate of the fluid control device. The synchronously-deformed structure also can be a curvy-surface synchronously-deformed structure, which is composed of plural curvy surfaces with different or identical curvatures. As shown in FIG. 8, the curvy-surface synchronously-deformed structure comprises plural curvy surfaces with different curvatures. A set of the plural curvy surfaces are formed on the outer surface 21a of the communication plate 21 of the deformable substrate 20', while another set of curvy surfaces corresponding to the former set are formed on the flexible plate 22. Under this circumstance, the specified depth δ is maintained between the curvy-surface synchronously-deformed structure and the bulge 230c of the vibration plate 230. Consequently, the fluid control device 2 with the curvy-surface synchronously-deformed structure is produced.

In some other embodiments, the synchronously-deformed structure is an irregular synchronously-deformed structure, which is produced by making two sets of identical irregular surfaces on the communication plate 21 and the flexible plate 22 of the deformable substrate 20'. Consequently, the irregular synchronously-deformed structure is defined by the communication plate 21 and the flexible plate 22. Under this circumstance, the specified depth δ is still maintained between the irregular synchronously-deformed structure and the bulge 230c of the vibration plate 230.

As mentioned above, the synchronously-deformed structure of the deformable substrate has a curvy structure, a conical structure, a convex structure, a curvy-surface structure or an irregular structure. Under this circumstance, the specified depth δ is maintained between the movable part 22a of the deformable substrate 20' and the bulge 230c of the vibration plate 230. Due to the specified depth δ, the gap h would not be too large or too small that causing the assembling errors. Moreover, the specified depth δ is sufficient to reduce the contact interference between the flexible plate 22 and the bulge 230c of the piezoelectric actuator 23. Consequently, the efficiency of transferring the fluid is enhanced, and the noise is reduced.

From the above descriptions, the present invention provides a fluid control device. The synchronously-deformed structure is formed on and defined by the communication plate and the flexible plate of the deformable substrate. During operation, the synchronously-deformed structure is moved in the direction toward or away from the piezoelectric actuator. Consequently, the specified depth between the flexible plate and the bulge of the vibration plate is maintained. The specified depth is sufficient to reduce the contact interference between the flexible plate and the bulge of the piezoelectric actuator. Consequently, the efficiency of transferring the fluid is enhanced, and the noise is reduced. Since the specified depth is advantageous for increasing the efficiency of transferring the fluid and reducing the noise, the performance of the product is increased and the quality of the fluid control device is significantly enhanced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A fluid control device, comprising:
a piezoelectric actuator comprising a piezoelectric element and a vibration plate, wherein the piezoelectric element is attached on a surface of the vibration plate, the piezoelectric element is subject to deformation in response to an applied voltage, and the vibration plate is subject to a curvy vibration in response to the deformation of the piezoelectric element; and
a deformable substrate comprising a communication plate and a flexible plate stacked on and coupled with the communication plate, wherein the communication plate and the flexible plate are subject to a synchronous deformation to form a synchronously-deformed structure as a whole,
wherein the deformable substrate is combined with and positioned on the vibration plate of the piezoelectric actuator, so that a specified depth is defined between the flexible plate of the deformable substrate and the vibration plate, wherein the flexible plate comprises a movable part corresponding to the vibration plate, and
wherein the communication plate has a central part directly below the movable part of the flexible plate, and the central part of the communication plate is spaced apart from the movable part of the flexible plate, and is synchronously deformable with the movable part of the flexible plate.

2. The fluid control device according to claim 1, wherein a synchronously-deformed region of the flexible plate for defining the synchronously-deformed structure includes the movable part, and the specified depth is maintained between the synchronously-deformed structure and the vibration plate.

3. The fluid control device according to claim 1, wherein a synchronously-deformed region of the flexible plate for defining the synchronously-deformed structure includes the movable part, the synchronously-deformed structure is a curvy synchronously-deformed structure, and the specified depth is maintained between the curvy synchronously-deformed structure and the vibration plate.

4. The fluid control device according to claim 1, wherein a synchronously-deformed region of the flexible plate for defining the synchronously-deformed structure includes the movable part, the synchronously-deformed structure is a conical synchronously-deformed structure, and the specified depth is maintained between the conical synchronously-deformed structure and the vibration plate.

5. The fluid control device according to claim 1, wherein a synchronously-deformed region of the flexible plate for defining the synchronously-deformed structure includes the movable part, the synchronously-deformed structure is a convex synchronously-deformed structure, and the specified depth is maintained between the convex synchronously-deformed structure and the vibration plate.

6. The fluid control device according to claim 1, wherein a synchronously-deformed region of the flexible plate for defining the synchronously-deformed structure includes the movable part and a region beyond the movable part of the flexible plate, and the specified depth is maintained between the synchronously-deformed structure and the vibration plate.

7. The fluid control device according to claim 1, wherein a synchronously-deformed region of the flexible plate for defining the synchronously-deformed structure includes the movable part and a region beyond the movable part of the flexible plate, the synchronously-deformed structure is a curvy synchronously-deformed structure, and the specified depth is maintained between the curvy synchronously-deformed structure and the vibration plate.

8. The fluid control device according to claim 1, wherein a synchronously-deformed region of the flexible plate for defining the synchronously-deformed structure includes the movable part and a region beyond the movable part of the flexible plate, the synchronously-deformed structure is a conical synchronously-deformed structure, and the specified depth is maintained between the conical synchronously-deformed structure and the vibration plate.

9. The fluid control device according to claim 1, wherein a synchronously-deformed region of the flexible plate for defining the synchronously-deformed structure includes the movable part and a region beyond the movable part of the flexible plate, the synchronously-deformed structure is a convex synchronously-deformed structure, and the specified depth is maintained between the convex synchronously-deformed structure and the vibration plate.

10. The fluid control device according to claim 1, wherein the synchronously-deformed structure of the deformable substrate is a curvy-surface synchronously-deformed structure composed of the communication plate and the flexible plate, the curvy-surface synchronously-deformed structure comprises plural curvy surfaces with different curvatures, and the specified depth is maintained between the curvy-surface synchronously-deformed structure and the vibration plate.

11. The fluid control device according to claim 1, wherein the synchronously-deformed structure of the deformable substrate is a curvy-surface synchronously-deformed structure composed of the communication plate and the flexible plate, the curvy-surface synchronously-deformed structure comprises plural curvy surfaces with an identical curvature, and the specified depth is maintained between the curvy-surface synchronously-deformed structure and the vibration plate.

12. The fluid control device according to claim 1, wherein the synchronously-deformed structure is an irregular synchronously-deformed structure composed of the communication plate and the flexible plate, and the specified depth is maintained between the irregular synchronously-deformed structure and the vibration plate.

13. The fluid control device according to claim 1, wherein the vibration plate of the piezoelectric actuator has a square shape, and the piezoelectric actuator further comprises: an outer frame arranged around the vibration plate; and at least one bracket connected between the vibration plate and the outer frame for elastically supporting the vibration plate.

14. The fluid control device according to claim 1, wherein the deformable substrate and the vibration plate are connected with each other through a medium, and the medium is an adhesive.

15. The fluid control device according to claim 1, wherein the fluid control device further comprises a housing for covering the piezoelectric actuator, and a temporary storage chamber is formed between the housing and the piezoelectric actuator, wherein the housing comprises at least one outlet, and the temporary storage chamber is in communication with an exterior of the housing through the at least one outlet.

16. The fluid control device according to claim 1, wherein the flexible plate comprises a central aperture, wherein the central aperture is located at or located near a center of the movable part of the flexible plate for allowing a fluid to go through.

17. The fluid control device according to claim 16, wherein the communication plate comprises at least one inlet, at least one convergence channel and a central cavity, wherein the at least one inlet runs through the communication plate and is in communication with a first end of the at least one convergence channel, and a second end of the at least one convergence channel is in communication with the central cavity, wherein the central cavity is aligned with the movable part of the flexible plate, and the central cavity is in communication with the central aperture of the flexible plate.

18. The fluid control device according to claim 1, wherein the central part of the communication plate is not in contact with the flexible plate.

19. A fluid control device, comprising:
a piezoelectric actuator comprising a piezoelectric element and a vibration plate, wherein the piezoelectric element is attached on a surface of the vibration plate, the piezoelectric element is subject to deformation in response to an applied voltage, and the vibration plate is subject to a curvy vibration in response to the deformation of the piezoelectric element; and
a deformable substrate comprising a communication plate and a flexible plate stacked on and coupled with the communication plate, wherein the communication plate and the flexible plate are subject to a synchronous deformation to form a synchronously-deformed structure as a whole,
wherein the deformable substrate is combined with and positioned on the vibration plate of the piezoelectric actuator, so that a specified depth is defined between the flexible plate of the deformable substrate and the vibration plate, wherein the flexible plate comprises a movable part corresponding to the vibration plate, and
wherein the communication plate has a central part directly below the movable part of the flexible plate, and the central part of the communication plate is not in contact with the flexible plate.

* * * * *